US012536067B2

(12) United States Patent
Song et al.

(10) Patent No.: US 12,536,067 B2
(45) Date of Patent: Jan. 27, 2026

(54) CONFIGURABLE IN-ARRAY EVENT TRACKING

(71) Applicant: Rambus Inc., San Jose, CA (US)

(72) Inventors: Taeksang Song, San Jose, CA (US); John Eric Linstadt, Palo Alto, CA (US); Steven C. Woo, Saratoga, CA (US); Craig E. Hampel, Los Altos, CA (US); Brent Steven Haukness, Sunnyvale, CA (US); Christopher Haywood, Fernandina Beach, FL (US)

(73) Assignee: Rambus Inc., San Jose, CA (US)

( * ) Notice: Subject to any disclaimer, the term of this patent is extended or adjusted under 35 U.S.C. 154(b) by 99 days.

(21) Appl. No.: 18/649,009

(22) Filed: Apr. 29, 2024

(65) Prior Publication Data

US 2024/0370331 A1 Nov. 7, 2024

Related U.S. Application Data

(60) Provisional application No. 63/464,461, filed on May 5, 2023.

(51) Int. Cl.
*G06F 11/10* (2006.01)
*G06F 11/14* (2006.01)
*G06F 16/14* (2019.01)

(52) U.S. Cl.
CPC ...... *G06F 11/1016* (2013.01); *G06F 11/1068* (2013.01); *G06F 11/1435* (2013.01); *G06F 16/14* (2019.01)

(58) Field of Classification Search
CPC ............. G06F 11/1016; G06F 11/1068; G06F 11/1435; G06F 16/14

USPC .................................................. 714/764, 773
See application file for complete search history.

(56) References Cited

U.S. PATENT DOCUMENTS

| 7,437,622 | B2 | 10/2008 | Love et al. |
| 7,782,995 | B2 | 8/2010 | Gara et al. |
| 8,514,999 | B2 | 8/2013 | Frazier et al. |
| 9,032,141 | B2 | 5/2015 | Bains et al. |

(Continued)

FOREIGN PATENT DOCUMENTS

WO    WO-2022-066371  A1    3/2022

OTHER PUBLICATIONS

US 11,119,840 B2, 09/2021, Shen et al. (withdrawn)

*Primary Examiner* — John J Tabone, Jr.
(74) *Attorney, Agent, or Firm* — The Neudeck Law Firm, LLC

(57) ABSTRACT

A random access memory device includes memory cells in each row for storing metadata related to accesses to that row. These metadata dedicated memory cells may store counter values that may be updated (e.g., incremented or decremented) when certain events occur (e.g., activate row—ACT, column read—CAS, error detected, etc.). Which events cause an update of the metadata stored in a row, and under what conditions related to the metadata/count value (e.g., threshold, match, threshold value, etc.) cause further action to be taken (e.g., alert controller, set mode register, etc.) are configurable by a controller. Additional functions related to the metadata/counters are also configurable such as scanning counter values to determine the row address with highest or lowest value and pattern matching (e.g., process identification match/mismatch).

20 Claims, 12 Drawing Sheets

(56) References Cited

U.S. PATENT DOCUMENTS

| | | | |
|---|---|---|---|
| 9,251,164 B2* | 2/2016 | Doshi | G06F 16/14 |
| 9,589,606 B2 | 3/2017 | Lin et al. | |
| 10,254,968 B1* | 4/2019 | Gazit | G06F 3/0611 |
| 10,825,534 B2 | 11/2020 | Nale | |
| 10,885,966 B1 | 1/2021 | Devaux et al. | |
| 10,976,943 B2 | 4/2021 | Willcock | |
| 11,449,266 B2 | 9/2022 | Hieb et al. | |
| 11,768,734 B2* | 9/2023 | Song | G06F 11/1064 |
| | | | 714/764 |
| 12,346,582 B2* | 7/2025 | Cariello | G06F 3/0659 |
| 2018/0096018 A1* | 4/2018 | Cazin | G06F 16/273 |
| 2022/0035739 A1* | 2/2022 | Ballapuram | G06F 3/0679 |
| 2023/0055293 A1* | 2/2023 | Song | G06F 11/1064 |
| 2023/0056492 A1* | 2/2023 | Song | G06F 3/0659 |
| 2023/0153206 A1* | 5/2023 | Hosmani | G06F 11/108 |
| | | | 714/6.24 |
| 2023/0291567 A1* | 9/2023 | Krishnan | H04L 9/0894 |
| 2023/0350581 A1* | 11/2023 | Ayyapureddi | G06F 3/0622 |
| 2024/0370331 A1* | 11/2024 | Song | G06F 11/1068 |
| 2025/0045197 A1* | 2/2025 | Linstadt | G06F 12/0223 |
| 2025/0156087 A1* | 5/2025 | Ayyapureddi | G11C 7/1045 |

* cited by examiner

RECEIVE, BY A MEMORY COMPONENT, WHERE THE MEMORY COMPONENT INCLUDES A DYNAMIC RANDOM ACCESS MEMORY (DRAM) ARRAY, AND THE DRAM ARRAY IS TO STORE A PLURALITY OF ROW INFORMATION ENTRIES WHERE EACH ROW INFORMATION ENTRY COMPRISES A ROW DATA FIELD AND A METADATA FIELD, A FIRST INDICATOR TO CONFIGURE FIRST CIRCUITRY TO PERFORM A FIRST FUNCTION ON VALUES OF METADATA FIELDS OF ACCESSED ROW INFORMATION ENTRIES
302

CONFIGURE THE FIRST CIRCUITRY TO PERFORM THE FIRST FUNCTION ON THE VALUES OF THE METADATA FIELDS OF ACCESSED ROW INFORMATION ENTRIES
304

RECEIVE, BY THE MEMORY COMPONENT, A SECOND INDICATOR TO CONFIGURE SECOND CIRCUITRY TO PERFORM A FIRST COMPARISON FUNCTION WITH VALUES ASSOCIATED WITH METADATA FIELDS OF ACCESSED ROW INFORMATION ENTRIES
306

CONFIGURE THE SECOND CIRCUITRY TO PERFORM THE FIRST COMPARISON FUNCTION WITH THE VALUES OF THE METADATA FIELDS OF ACCESSED ROW INFORMATION ENTRIES.
308

*FIG. 3*

CONFIGURE FIRST CIRCUITRY TO WRITE A FIRST HOST PROCESS IDENTIFICATION INDICATOR TO A FIRST PLURALITY OF METADATA FIELDS OF ACCESSED ROW INFORMATION ENTRIES
502

CONFIGURE SECOND CIRCUITRY TO COMPARE METADATA VALUES ACCESSED FROM A SECOND PLURALITY OF METADATA FIELDS FROM ACCESSED ROW INFORMATION ENTRIES TO THE FIRST HOST PROCESS IDENTIFICATION INDICATOR
504

BASED ON THE RESPECTIVE RESULTS OF THE COMPARISONS OF THE METADATA VALUES ACCESSED FROM THE SECOND PLURALITY OF METADATA FIELDS, DETERMINE, BY A MEMORY COMPONENT, WHETHER TO INITIATE A FIRST ACTION
506

*FIG. 5*

TRANSMIT, TO A MEMORY COMPONENT, WHERE THE MEMORY COMPONENT INCLUDES A DYNAMIC RANDOM ACCESS MEMORY (DRAM) ARRAY, AND THE DRAM ARRAY IS TO STORE A PLURALITY OF ROW INFORMATION ENTRIES WHERE EACH ROW INFORMATION ENTRY COMPRISES A ROW DATA FIELD AND A METADATA FIELD, A FIRST INDICATOR TO CONFIGURE FIRST CIRCUITRY TO PERFORM A FIRST FUNCTION ON VALUES OF METADATA FIELDS OF ACCESSED ROW INFORMATION ENTRIES
602

TRANSMIT, TO THE MEMORY COMPONENT, A SECOND INDICATOR TO CONFIGURE SECOND CIRCUITRY TO PERFORM A FIRST COMPARISON FUNCTION WITH VALUES ASSOCIATED WITH METADATA FIELDS OF ACCESSED ROW INFORMATION ENTRIES
604

RECEIVE, FROM THE MEMORY COMPONENT, A THIRD INDICATOR THAT IS BASED ON A RESULT OF THE FIRST COMPARISON FUNCTION WITH A FIRST VALUE ASSOCIATED WITH A METADATA FIELD OF A FIRST ACCESSED ROW INFORMATION ENTRY
606

*FIG. 6*

```
┌─────────────────────────────────────┐
│ TRANSMIT A FIRST INDICATOR TO CONFIGURE │
│ FIRST CIRCUITRY OF A MEMORY DEVICE TO   │
│ PERFORM A FIRST FUNCTION ON VALUES OF   │
│ METADATA FIELDS OF ACCESSED ROW         │
│ INFORMATION ENTRIES                     │
│ 702                                     │
└─────────────────────────────────────┘
                    │
┌─────────────────────────────────────┐
│ TRANSMIT A SECOND INDICATOR TO CONFIGURE │
│ SECOND CIRCUITRY OF THE MEMORY DEVICE TO │
│ PERFORM A FIRST COMPARISON FUNCTION WITH │
│ VALUES ASSOCIATED WITH METADATA FIELDS OF │
│ ACCESSED ROW INFORMATION ENTRIES         │
│ 704                                      │
└─────────────────────────────────────┘
                    │
┌─────────────────────────────────────┐
│ TRANSMIT A THIRD INDICATOR TO CONFIGURE │
│ THIRD CIRCUITRY OF THE MEMORY DEVICE TO,│
│ BASED ON THE RESULTS OF THE FIRST       │
│ COMPARISON FUNCTION, DETERMINE WHETHER  │
│ TO INITIATE A FIRST ACTION BY THE MEMORY│
│ COMPONENT                               │
│ 706                                     │
└─────────────────────────────────────┘
                    │
┌─────────────────────────────────────┐
│ RECEIVE A FOURTH INDICATOR, FROM THE    │
│ MEMORY COMPONENT, THAT IS TRANSMITTED BY│
│ THE MEMORY DEVICE BASED ON A RESULT OF  │
│ THE FIRST COMPARISON FUNCTION THAT IS   │
│ BASED ON A FIRST VALUE ASSOCIATED WITH A│
│ FIRST METADATA FIELD OF A FIRST ACCESSED│
│ ROW INFORMATION ENTRY                   │
│ 708                                     │
└─────────────────────────────────────┘
```

*FIG. 7*

RECEIVE, BY A MEMORY COMPONENT AND DIRECTED TO A FIRST MEMORY DEVICE OF THE MEMORY COMPONENT, A FIRST INDICATOR TO CONFIGURE FIRST CIRCUITRY OF THE FIRST MEMORY DEVICE TO PERFORM A FIRST FUNCTION ON VALUES OF METADATA FIELDS OF ACCESSED ROW INFORMATION ENTRIES OF THE FIRST MEMORY DEVICE
902

RECEIVE, BY THE MEMORY COMPONENT AND DIRECTED TO THE FIRST MEMORY DEVICE OF THE MEMORY COMPONENT, A SECOND INDICATOR TO CONFIGURE SECOND CIRCUITRY OF THE FIRST MEMORY DEVICE TO PERFORM A FIRST COMPARISON FUNCTION WITH VALUES ASSOCIATED WITH METADATA FIELDS OF ACCESSED ROW INFORMATION ENTRIES OF THE FIRST MEMORY DEVICE
906

RECEIVE, BY THE MEMORY COMPONENT AND DIRECTED TO THE FIRST MEMORY DEVICE OF THE MEMORY COMPONENT, A THIRD INDICATOR TO CONFIGURE THIRD CIRCUITRY OF THE FIRST MEMORY DEVICE TO, BASED ON THE RESULTS OF THE FIRST COMPARISON FUNCTION, DETERMINE WHETHER TO INITIATE A FIRST ACTION BY THE FIRST MEMORY DEVICE
908

RECEIVE, BY THE MEMORY COMPONENT AND DIRECTED TO A SECOND MEMORY DEVICE OF THE MEMORY COMPONENT, A FOURTH INDICATOR TO CONFIGURE FIRST CIRCUITRY OF THE SECOND MEMORY DEVICE TO PERFORM A SECOND FUNCTION ON VALUES OF METADATA FIELDS OF ACCESSED ROW INFORMATION ENTRIES OF THE SECOND MEMORY DEVICE
910

RECEIVE, BY THE MEMORY COMPONENT AND DIRECTED TO THE SECOND MEMORY DEVICE OF THE MEMORY COMPONENT, A FIFTH INDICATOR TO CONFIGURE SECOND CIRCUITRY OF THE SECOND MEMORY DEVICE TO PERFORM A SECOND COMPARISON FUNCTION WITH VALUES ASSOCIATED WITH METADATA FIELDS OF ACCESSED ROW INFORMATION ENTRIES OF THE SECOND MEMORY DEVICE
912

RECEIVE, BY THE MEMORY COMPONENT AND DIRECTED TO THE SECOND MEMORY DEVICE OF THE MEMORY COMPONENT, A SIXTH INDICATOR TO CONFIGURE THIRD CIRCUITRY OF THE SECOND MEMORY DEVICE TO, BASED ON THE RESULTS OF THE SECOND COMPARISON FUNCTION, DETERMINE WHETHER TO INITIATE A SECOND ACTION BY THE SECOND MEMORY DEVICE
914

*FIG. 9*

TRANSMIT, TO A MEMORY COMPONENT AND DIRECTED TO A FIRST MEMORY DEVICE OF THE MEMORY COMPONENT, A FIRST INDICATOR TO CONFIGURE FIRST CIRCUITRY OF THE FIRST MEMORY DEVICE TO PERFORM A FIRST FUNCTION ON VALUES OF METADATA FIELDS OF ACCESSED ROW INFORMATION ENTRIES OF THE FIRST MEMORY DEVICE
1002

TRANSMIT, TO THE MEMORY COMPONENT AND DIRECTED TO THE FIRST MEMORY DEVICE OF THE MEMORY COMPONENT, A SECOND INDICATOR TO CONFIGURE SECOND CIRCUITRY OF THE FIRST MEMORY DEVICE TO PERFORM A FIRST COMPARISON FUNCTION WITH VALUES ASSOCIATED WITH METADATA FIELDS OF ACCESSED ROW INFORMATION ENTRIES OF THE FIRST MEMORY DEVICE
1006

TRANSMIT, TO THE MEMORY COMPONENT AND DIRECTED TO THE FIRST MEMORY DEVICE OF THE MEMORY COMPONENT, A THIRD INDICATOR TO CONFIGURE THIRD CIRCUITRY OF THE FIRST MEMORY DEVICE TO, BASED ON THE RESULTS OF THE FIRST COMPARISON FUNCTION, DETERMINE WHETHER TO INITIATE A FIRST ACTION BY THE FIRST MEMORY DEVICE
1008

TRANSMIT, TO THE MEMORY COMPONENT AND DIRECTED TO A SECOND MEMORY DEVICE OF THE MEMORY COMPONENT, A FOURTH INDICATOR TO CONFIGURE FIRST CIRCUITRY OF THE SECOND MEMORY DEVICE TO PERFORM A SECOND FUNCTION ON VALUES OF METADATA FIELDS OF ACCESSED ROW INFORMATION ENTRIES OF THE SECOND MEMORY DEVICE
1010

TRANSMIT, TO THE MEMORY COMPONENT AND DIRECTED TO THE SECOND MEMORY DEVICE OF THE MEMORY COMPONENT, A FIFTH INDICATOR TO CONFIGURE SECOND CIRCUITRY OF THE SECOND MEMORY DEVICE TO PERFORM A SECOND COMPARISON FUNCTION WITH VALUES ASSOCIATED WITH METADATA FIELDS OF ACCESSED ROW INFORMATION ENTRIES OF THE SECOND MEMORY DEVICE
1012

TRANSMIT, TO THE MEMORY COMPONENT AND DIRECTED TO THE SECOND MEMORY DEVICE OF THE MEMORY COMPONENT, A SIXTH INDICATOR TO CONFIGURE THIRD CIRCUITRY OF THE SECOND MEMORY DEVICE TO, BASED ON THE RESULTS OF THE SECOND COMPARISON FUNCTION, DETERMINE WHETHER TO INITIATE A SECOND ACTION BY THE SECOND MEMORY DEVICE
1014

*FIG. 10*

CONFIGURABLE IN-ARRAY EVENT TRACKING

BRIEF DESCRIPTION OF THE DRAWINGS

FIG. 3 is a flowchart illustrating a method of operating a memory component.

FIG. 5 is a flowchart illustrating a method of configuring heap corruption detection.

FIG. 6 is a flowchart illustrating a method of operating a memory controller.

FIG. 7 is a flowchart illustrating a method of tracking metadata based events.

FIG. 9 is a flowchart illustrating a method of concurrently tracking multiple types of metadata based events.

FIG. 10 is a flowchart illustrating a method of configuring a memory component to track multiple types of metadata based events.

DETAILED DESCRIPTION OF THE EMBODIMENTS

In an embodiment, a random access memory device includes memory cells associated with (or in) each row for storing metadata related to accesses to that row. For example, these metadata dedicated memory cells may store counter values that may be updated (e.g., incremented or decremented) when certain events occur (e.g., activate row—ACT, column read—CAS, error detected, etc.). In an embodiment, which events cause an update of the metadata stored in a row, and under what conditions related to the metadata/count value (e.g., threshold, match, threshold value, etc.) cause further action to be taken (e.g., alert controller, set mode register, etc.) are configurable by a controller. Additional functions related to the metadata/counters are also configurable such as scanning counter values to determine the row address with highest or lowest value and pattern matching (e.g., process identification match/mismatch). Applications of various metadata/counter configurations/functions include, but are not limited to, row hammer tracking, per-row error counting, usage statistics (e.g., hot/cold page detection), access trace reconstruction, packet inspection, and heap corruption detection.

In an embodiment, multiple memory devices of a multi-memory device component (e.g., memory module, device stack, etc.) are accessed concurrently using the same command and address. By configuring each of the individual memory devices to count different events and/or perform different functions, multiple types of events may be counted/monitored.

The descriptions and embodiments disclosed herein may be made with references to DRAM memory devices. This, however, should be understood to be a first example. Other example memory technologies include, but are not limited to, static random access memory (SRAM), non-volatile memory (such as flash), conductive bridging random access memory (CBRAM—a.k.a., programmable metallization cell—PMC), resistive random access memory (a.k.a., RRAM or ReRAM), magnetoresistive random-access memory (a.k.a., MRAM), Spin-Torque Transfer (a.k.a, STT-MRAM), phase change memory (a.k.a., PCM), ferroelectric random access memory (a.k.a., FeRAM, or FRAM), and the like, and/or combinations thereof. Accordingly, it should be understood that in the disclosures and/or descriptions given herein, these aforementioned technologies may be substituted for, included with, and/or encompassed within, references to memory IC die, memory devices, memory, DRAM, DRAM devices, memory arrays, and/or DRAM arrays made herein.

Figure 1A:
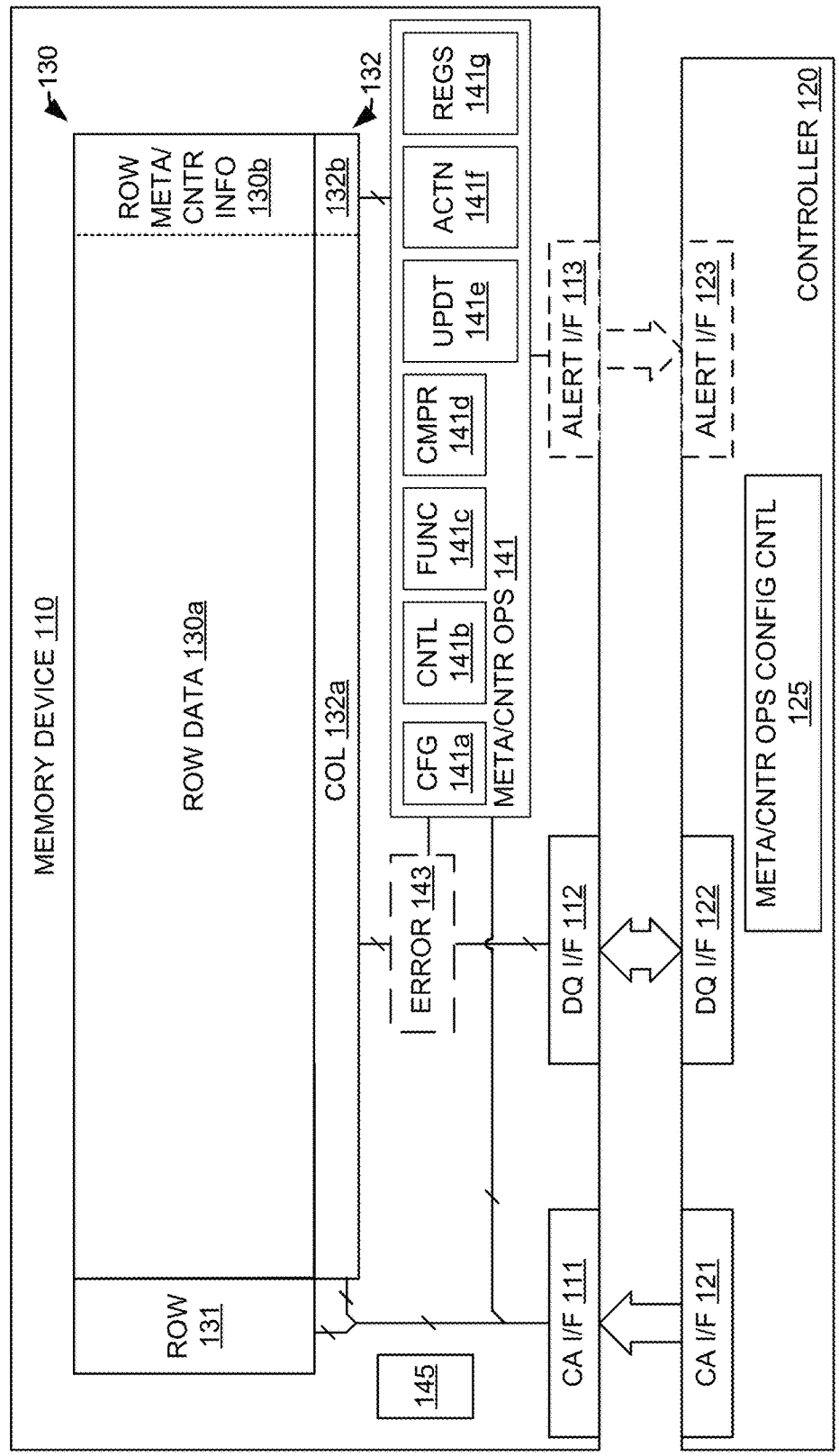
FIG. 1A is a block diagram illustrating a memory system.

FIG. 1 is a block diagram illustrating a memory system. In FIG. 1, memory system 100 comprises memory device 110 and memory controller 120. Memory device 110 includes command/address (CA) interface 111, data (DQ) interface 112, memory array 130, row circuitry 131, column circuitry 132, metadata/counter operations circuitry 141, optional error circuitry 143, and control circuitry 145. In some embodiments, memory device 110 may also include alert interface 113. Metadata/counter operations circuitry 141 includes configuration circuitry 141a, control circuitry 141b, function circuitry 141c, comparison circuitry 141d, metadata/counter update circuitry 141e, action circuitry 141f, and register circuitry 141g. The rows and columns of memory array 130 may be organized into rows and columns of memory array tiles (MATs). Memory controller 120 includes CA interface 121, DQ interface 122, and metadata/counter operation configuration control circuitry 125. In some embodiments, controller 120 may also include alert interface 123.

CA interface 121 of controller 120 is operatively coupled to CA interface 111 of memory device 110. CA interface 121 of controller 120 is operatively coupled to CA interface 111 of memory device 110 to at least communicate, from controller 120, commands, addresses, and configuration information to memory device 110. DQ interface 122 of controller 120 is operatively coupled to DQ interface 112 of memory device 110. DQ interface 122 of controller 120 is operatively coupled to DQ interface 112 of memory device 110 to communicate data between controller 120 and memory device 110. Optional alert interface 123 of controller 120, when present, is operatively coupled to alert interface 113 of memory device 110 (when present). Alert interface 123 of controller 120 is operatively coupled to alert interface 113 memory device 110 to at least communicate, from memory device 110, alert indicators (e.g., row counter threshold met/exceeded, error threshold met/exceeded, etc.) to controller 120.

Memory controller 120 and memory device 110 may be integrated circuit type devices, such as are commonly referred to as "chips". A memory controller, such as memory controller 120, manages the flow of data going to and from memory devices and/or memory modules. Memory device 110 may be a standalone device, or may be a component of a memory module such as a DIMM module used in servers. Memory device 110 may be, or be part of, a component having a "stack" of memory devices. Memory device 110 may be a device that adheres to, or is compatible with, a dynamic random access memory (DRAM) specification. A memory controller can be a separate, standalone chip, or integrated into another chip. For example, a memory controller 120 may be included on a single die with a microprocessor, included as a chip co-packaged with one or more microprocessor chips, included as part of a more complex integrated circuit system such as a block of a system on a chip (SOC), or be remotely coupled to one or more microprocessors via a fabric interconnect or other type of interconnect.

CA interface 111 of memory device 110 is operatively coupled to row circuitry 131, column circuitry 132, and metadata/counter operations circuitry 141. CA interface 111 is operatively coupled to row circuitry 131 to at least to activate rows in memory array 130. CA interface 111 is operatively coupled to column circuitry 132 to at least sense values from activated rows, and to decode and provide the values of selected columns to other circuitry of memory device 110 (e.g., error control circuitry 143, metadata/counter operations circuitry 141, DQ interface 112, etc.) Error control circuitry 143 may be operatively coupled to metadata/counter operations circuitry 141. Optional error control circuitry 143, if present, may comprise error-detection code (EDC) and/or error correction code (ECC) functionality to detect and/or correct data and/or metadata errors.

Memory array 130 of memory device 110 is logically subdivided into column groups 130a-130b (or MAT groups, columns of MATs, sections, assignments, and/or associations). Column group 130a is to store data provided by controller 120. Metadata/counter information field 130b is to store metadata associated with the rows in memory array 130. Thus, it should be understood that each row of memory array 130 may be viewed as comprising two "fields"—a data field and a metadata field. In an embodiment, the metadata field of a row may be used to store a counter value or other information related to the row it is associated with and/or resides in (i.e., is activated in response to the same row address as the rest of the row—a.k.a., metadata/counter field). At least how and when the metadata values associated with the rows of memory array 130 are used and/or updated is based on the configuration (e.g., stored by configuration circuitry 141a) of metadata/counter operations circuitry 141 provided by controller 120.

Figure 1B:
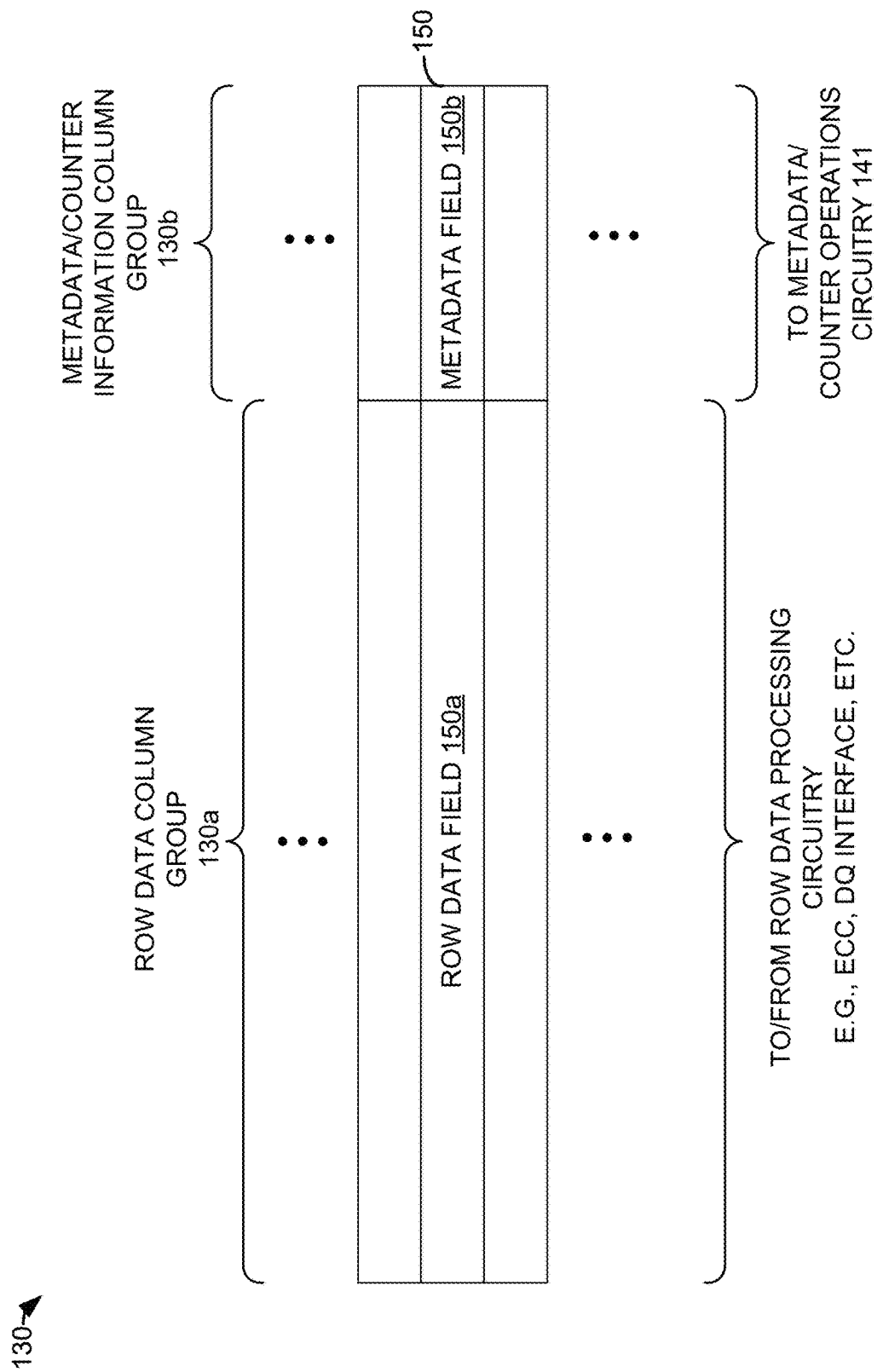
FIG. 1B is an illustration of information fields in a memory array row.

FIG. 1B is an illustration of information fields in a memory array row. In FIG. 1B, row 150 (a.k.a., row information entry 150) includes row data field 150a and metadata field 150b. The row data information stored by row data field 150a is from the cells of row information entries 150 that are part of row data column group 130a. The metadata/counter information stored by metadata field 150b is from the cells of row information entry 150 that are part of metadata/counter information field 130b. In an embodiment, when row information entry 150 is accessed, the data in row data field 150a is provided to, or comes from, row data processing circuitry of memory device 110 (e.g., error control circuitry 143, DQ interface 112, etc.). In some configurations, when row information entry 150 is accessed, the data in row metadata field 150b may be provided to, or comes from, metadata/counter operations circuitry 141. In some configurations (e.g., pattern matching), all or part of the data from both row data field 150a and metadata field 150b may be provided to, or comes from, metadata/counter operations circuitry 141.

Returning now to FIG. 1A, column circuitry 132 is subdivided into column circuitry groups 132a-132b that may have different access timing requirements. For example, metadata/counter information field 130b, which is activated and written by column circuitry group 132b, may comprise a smaller MAT(s), and/or column circuitry group 132b may have reduced (or none) column decoding logic (e.g., the data from entirety of column circuitry group 132b may be provided directly to metadata/counter operations circuitry 141 regardless of the column address and is therefore not dependent upon decoding the column address). This may allow metadata/counter information field 130b to be accessed (e.g., read, written, refreshed, etc.) in less time than column group 130a. In an embodiment, metadata/counter information field 130b may be read, the read data processed by metadata/counter operations circuitry 141, and the results of processing by metadata/counter operations circuitry 141 written back to (i.e., updated) metadata/counter information field 130b before the wordline of the row in memory array 130 being accessed is deactivated thereby storing a new (updated) metadata value in the metadata/counter information field of the activated row.

In an embodiment, metadata/counter operations circuitry 141 comprises configuration circuitry 141a, control circuitry 141b, function circuitry 141c, comparison circuitry 141d, metadata/counter update circuitry 141e, action circuitry 141f, and register circuitry 141g. Configuration circuitry 141a may be configured to control the functions and/or operations of one or more of control circuitry 141b, function circuitry 141c, comparison circuitry 141d, metadata/counter update circuitry 141e, action circuitry 141f, and register circuitry 141g. Configuration circuitry 141a may be configured by controller 120 (and metadata/counter operation configuration control circuitry 125, in particular) to configure metadata/counter operations circuitry 141 to perform various functions on, or based on, the metadata/counter value(s) stored in the metadata/counter information fields 130b.

Control circuitry 141b may be configured (e.g., in response to configuration circuitry 141a) to control the operations, functions and/or sequence of operations, data flows, etc. of function circuitry 141c, comparison circuitry 141d, metadata/counter update circuitry 141e, action circuitry 141f, and register circuitry 141g. Function circuitry 141c may be configured and/or controlled, for example, to perform various functions on values stored in the metadata/counter information field 130b of each row of array 130. For example, function circuitry 141c may be configured to increment, decrement, advance (e.g., +2, −2), set to value (e.g., '0'), reset, etc. the value read from the metadata/counter information field 130b (which is then stored back to array 130—e.g., by update circuitry 141e).

Comparison circuitry 141d may be configured and/or controlled, for example, to perform comparisons of values stored in the metadata/counter information field 130b of each row of array 130 or updated values to be stored in the metadata/counter information field 130b of each row of array 130. Comparison circuitry may perform, for example, operators such as equal, not equal, less than, greater than, less than or equal to, greater than or equal to, pattern match, partial pattern match, etc. Comparison circuitry 141d may be configured and/or controlled to perform comparisons with set values (e.g., '0'), values stored in register circuitry 141g (e.g., process identification indicator), etc. For example, comparison circuitry 141d may be configured to compare the value read from the metadata/counter information field 130b with a threshold value (e.g., configured by configuration circuitry 141a). In response to one or more results and/or indicators produced by comparison circuitry 141d, metadata/counter operations circuitry 141 may perform additional actions (e.g., update metadata/counter value, alert controller, set mode register, reset metadata/counter value, set metadata/counter value, etc.) or take no action (e.g., no operation).

Update circuitry 141e may be configured and/or controlled to perform updates of values stored in the metadata/counter information field 130b of each row of array 130. Update circuitry 141e may be configured and/or controlled, for example, to perform updates of values stored in the metadata/counter information field 130b of each row of array 130 based on one or more results and/or indicators produced by one or more of function circuitry 141c, comparison circuitry 141d, action circuitry 141f, and/or register circuitry 141g.

Action circuitry 141f may be configured and/or controlled to perform actions in response to one or more results and/or indicators produced by one or more of function circuitry 141c, comparison circuitry 141d, update circuitry 141e, and/or register circuitry 141g. Example actions initiated and/or performed by action circuitry 141f include reset a value (e.g., in metadata/counter information field 130b or register circuitry 141g), set mode register, alert controller (e.g., via alert interface 113 and alert interface 123): of a warning, of an error, of a value, that an overflow or underflow has occurred, of a notice to read a particular mode register, that no notice is needed (e.g., threshold not met), that nothing is being returned (e.g., no notice, no action).

In various embodiments, metadata/counter operations circuitry 141 may be configured to use the in-DRAM metadata/counter information fields 130b of array 130 to, for example, maintain a heatmap for hottest (e.g., activation count, most used, most recently used, etc.) row tracking and/or warmness detection and/or tracking. For example, metadata/counter operations circuitry 141 may be configured to update the metadata/counter information fields 130b of array 130 to count the number of activations of each row of array 130. If the metadata/counter information field 130b of an activated row is greater than a configured value (e.g., in configuration circuitry 141a or register circuitry 141g), then a row address and counter value (e.g., stored in register circuitry 141g) may be replaced with the row address and counter value that met the threshold condition (e.g., greater than). The row address and counter value with the lowest counter value (in register circuitry 141g) may be selected as the entry to be replaced. A similar operation may be configured to track errors per row (e.g., update row address with the highest number of errors during/after an error check and scrub—ECS—operation).

In another example, metadata/counter operations circuitry 141 may be configured to update the metadata/counter information fields with an ordinal value (e.g., $1^{st}$, $2^{nd}$, $3^{rd}$, etc.; $1^{st}$ most/least recent, $2^{nd}$ most/least recent, etc.) associated with the event or type of event. In another example, metadata/counter operations circuitry 141 may be configured to update the metadata/counter information fields with a configurable (e.g., $1^{st}$, $2^{nd}$, $3^{rd}$, . . . etc.) entry from a first-in first-out buffer that provides a running list, history, or snapshot of the most recently accessed (or activated) row addresses in a bank or bank group. In an embodiment, these ordinal metadata values may be used (e.g., by a host, or controller 120) to reconstruct address traces and/or directed graphs of address accesses.

In another example, if the activated row counter value in the metadata/counter information field 130b of an activated row is higher than a configured threshold, action circuitry 141f may save the current row address and counter value to a register (e.g., in register circuitry 141g) and send an alert to controller 120 (e.g., via alert interface 113 and alert interface 123). In response to the alert, controller 120 may read the register(s) (e.g., using a mode register read command) that are storing the row address and counter value that met/exceeded the threshold. In another example, controller 120 may, without receiving an alert, periodically read register circuitry 141g to learn whether an activated row counter value was higher than a configured threshold.

Figure 2:
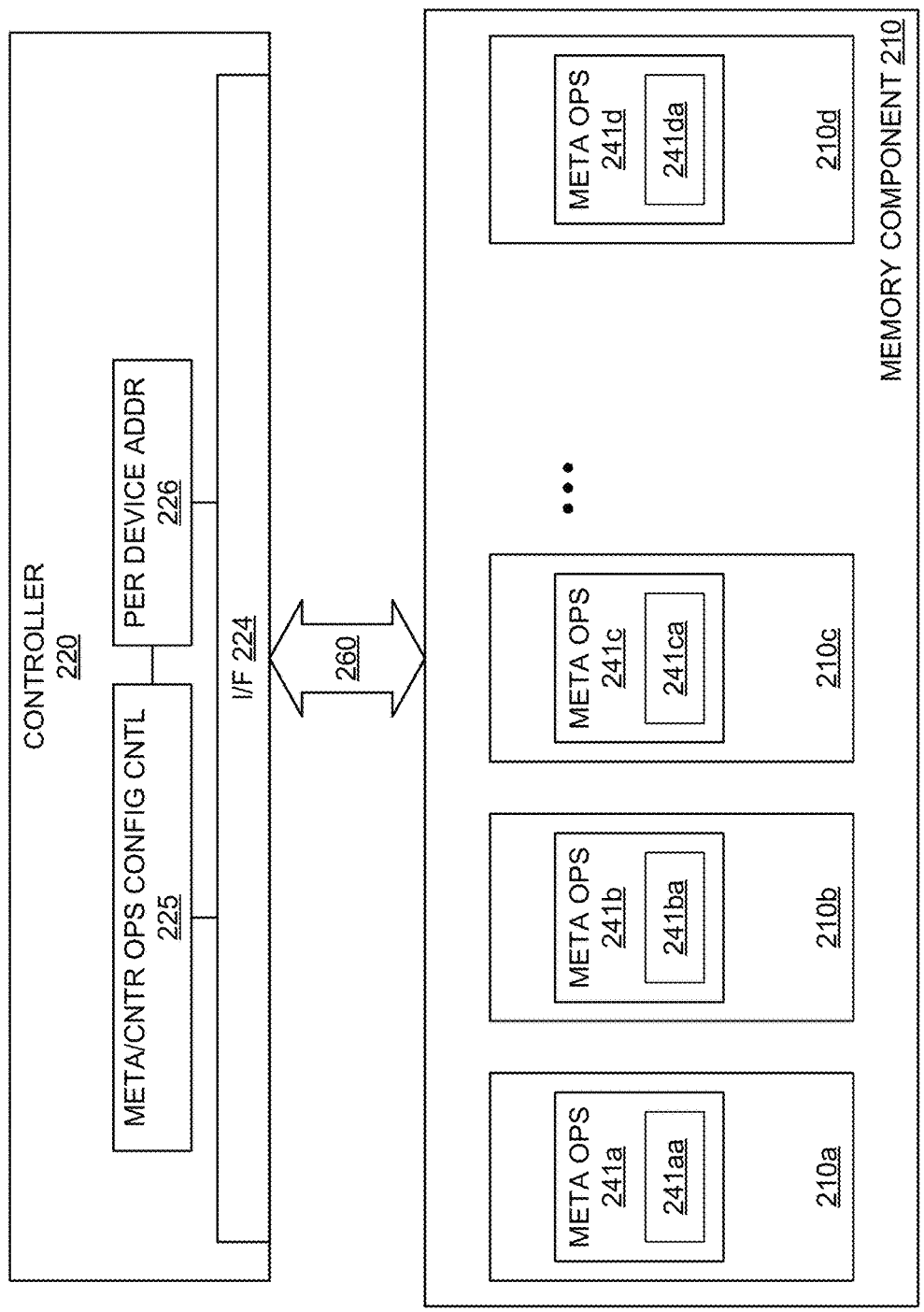
FIG. 2 is a block diagram illustrating a memory system with memory component per-device configurability.

FIG. 2 is a block diagram illustrating a memory system with memory component per-device configurability. In FIG. 2, memory system 200 comprises controller 220, memory component 210, and memory channel 260. Controller 220 comprises metadata/counter operation configuration control circuitry 225, per device addressing circuitry 226, and channel interface 224. Memory component 210 comprises memory devices 210a-210d. Metadata/counter operations configuration control circuitry 225 is operatively coupled to channel interface 224 and per device addressing circuitry 226. Per device addressing circuitry 226 is operatively coupled to channel interface 224.

Memory component 210 and controller 220 are operatively coupled via memory channel 260. Controller 220 is operatively coupled to channel 260 via memory channel interface 224. Memory channel 260 may comprise command/address (e.g., via CA interfaces 111 and 121), data (e.g., via DQ interfaces 112 and 122), and optionally action communication functions (e.g., alert interface 113 and alert interface 123).

Each memory device 210a-210d respectively comprises metadata/counter operations circuitry 241a-241d. Each metadata/counter operations circuitry 241a-241d respectively comprises configuration circuitry 241aa-241da.

In an embodiment, memory devices 210a-210d may be, have similar, and/or the same functions and operations, as memory device 110. Accordingly, metadata/counter operations circuitry 241a-241d may respectively have similar, and/or the same functions and operations, as metadata/counter operations circuitry 141.

Memory controller 220 and memory devices 210a-210d may be integrated circuit type devices, such as are commonly referred to as "chips". A memory controller, such as memory controller 220, manages the flow of data going to and from memory devices and/or memory modules. Memory component 210 may be disposed on a memory module such as a DIMM module used in servers. Memory component 210 may be, or be part of, a component having a "stack" of memory devices. Memory devices 210a-210d may be devices that adhere to, or are compatible with, a dynamic random access memory (DRAM) specification. A memory controller can be a separate, standalone chip, or integrated into another chip. For example, a memory controller 220 may be included on a single die with a microprocessor, included as a chip co-packaged with one or more microprocessor chips, included as part of a more complex integrated circuit system such as a block of a system on a chip (SOC), or be remotely coupled to one or more microprocessors via a fabric interconnect or other type of interconnect.

In an embodiment, during many/most access operations, the command/address functions of channel 260 (and interface 224) are distributed by memory component 210 to memory devices 210a-210d in common. In other words, each command/address transmitted by controller 220 to memory component 210 is provided to each of memory devices 210a-210d unaltered such that each memory device 210a-210d performs the same function (e.g., read, write, refresh, precharge, activate, etc.). However, per device addressing circuitry 226 allows controller 220 (and interface metadata/counter operations configuration control circuitry 225, in particular) to address and configure (e.g., set values etc.) configuration circuitry 241aa-241da independently of the configurations and/or accesses to, the other of configuration circuitry 241aa-241da. This allows each metadata/ counter operations circuitry 241a-241d to be configured by controller 220 to perform different metadata/counter operations.

In an embodiment, metadata/counter operations configuration control circuitry 225 may use per device addressing circuitry 226 to configure metadata/counter operations circuitry 241a-241d (e.g., by setting registers, etc. of configuration circuitry 241aa-241da) to perform different metadata/counter operations in response to the same command and address transmitted by controller 220. For example, metadata/counter operations circuitry 241a may be configured (e.g., via configuration circuitry 241aa) to count the activations of each row in memory device 210a. Metadata/counter operations circuitry 241b may be configured (e.g., via configuration circuitry 241ba) to count column activations. Metadata/counter operations circuitry 241c may be configured (e.g., via configuration circuitry 241ca) to count detected row errors, and so on. Since all of memory devices 210a-210d of memory component 210 receive the same commands and addresses, and those commands and addresses are distributed to each of memory devices 210a-210d, the different configurations of metadata/counter operations circuitry 241b allow multiple metadata/counting functions to be performed and/or monitored by memory component 210. Additional examples include, as described herein, storing an activation sequence number (e.g., ordinal), or storing the nth entry of a FIFO which maintains the addresses of the M number of most recent activations (where M is an integer greater than one—e.g., 64).

FIG. 3 is a flowchart illustrating a method of operating a memory component. One or more of the steps illustrated in FIG. 3 may be performed by, for example, memory system 100, memory system 200, and/or their components. By a memory component, where the memory component includes a dynamic random access memory (DRAM) array, and the DRAM array is to store a plurality of row information entries where each row information entry comprises a row data field and a metadata field, a first indicator to configure first circuitry to perform a first function on values of metadata fields of accessed row information entries is received (302). For example, memory device 110 may receive, from controller 120, an indicator (e.g., mode register set—MRS—command) that configures metadata/counter operations circuitry 141, and function circuitry 141c, in particular, to perform a first function (e.g., increment metadata field value when row is activated) on the values in metadata field 150b of row information entries 150 being accessed in memory array 130.

The first circuitry is configured to perform the first function on the values of the metadata fields of accessed row information entries (304). For example, memory device may configure (e.g., using configuration circuitry 141a) metadata/counter operations circuitry 141, and function circuitry 141c, in particular, to perform the first function (e.g., increment metadata field value when row is activated) on the metadata field 150b of row information entries 150 as they are accessed. By the memory component, a second indicator is received to configure second circuitry to perform a first comparison function with values associated with metadata field of access row information entries (306). For example, memory device 110 may receive, from controller 120, another indicator (e.g., MRS command) that configures metadata/counter operations circuitry 141, and comparison circuitry 141d, in particular, to perform a comparison function (e.g., has metadata field value met or exceeded a threshold) using the values in metadata field 150b of row information entries 150 being accessed in memory array 130.

Second circuitry is configured to perform the first comparison function with the values of the metadata fields of accessed row information entries (308). For example, memory device may configure (e.g., using configuration circuitry 141a) metadata/counter operations circuitry 141, and comparison circuitry 141d, in particular, to perform the first comparison function (e.g., has metadata field value met or exceeded a threshold) on the metadata field 150b of row information entries 150 as they are accessed.

Figure 4:
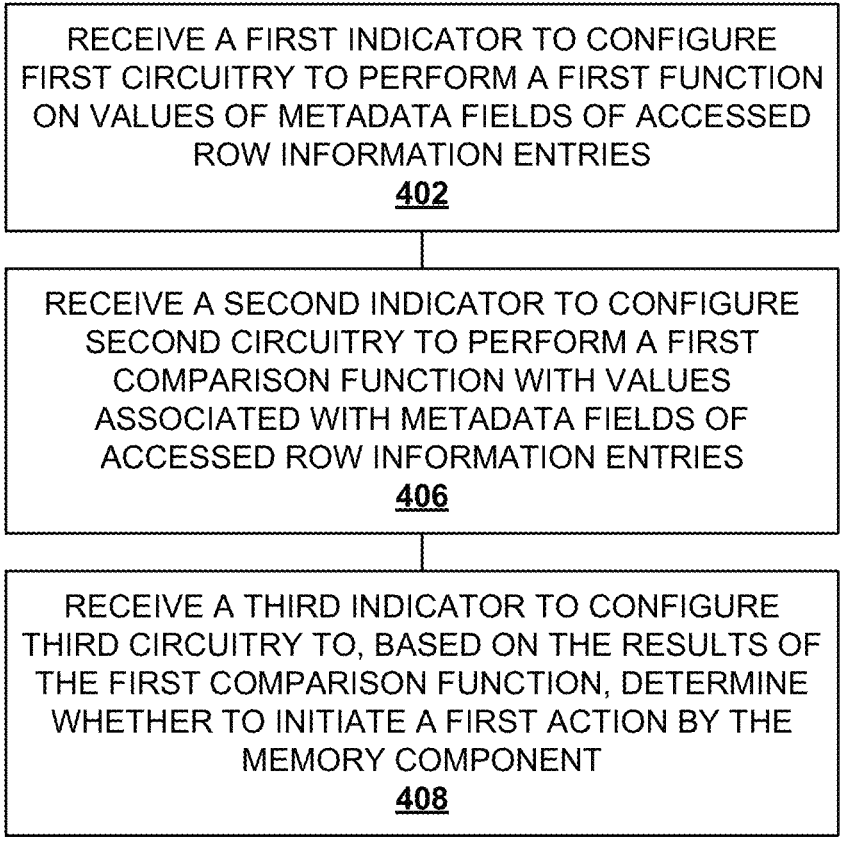
FIG. 4 is a flowchart illustrating a method of configuring a memory component.

FIG. 4 is a flowchart illustrating a method of configuring a memory component. One or more of the steps illustrated in FIG. 4 may be performed by, for example, memory system 100, memory system 200, and/or their components. A first indicator to configure first circuitry to perform a first function on values of metadata field of accessed row information entries is received (402). For example, memory device 110 may receive, from controller 120, an indicator (e.g., mode register set-MRS-command) that configures metadata/counter operations circuitry 141, and function circuitry 141c, in particular, to perform a first function (e.g., increment metadata field value when row is activated) on the values in metadata field 150b of row information entries 150 being accessed in memory array 130.

A second indicator to configure second circuitry to perform a first comparison function with values associated with metadata fields of accessed row information entries is received (406). For example, memory device 110 may receive, from controller 120, another indicator (e.g., MRS command) that configures metadata/counter operations circuitry 141, and comparison circuitry 141d, in particular, to perform a comparison function (e.g., has metadata field value met or exceeded a threshold) using the values in metadata field 150b of row information entries 150 being accessed in memory array 130. A third indicator is received to configure third circuitry to, based on the results of the first comparison function, determine whether to initiate a first action by the memory component (408). For example, memory device 110 may receive, from controller 120, yet another indicator (e.g., MRS command) that configures metadata/counter operations circuitry 141, and action circuitry 141f, in particular, to, based on a result produced by comparison circuitry 141d, determine whether to initiate an action (e.g., notify controller 120 if comparison circuitry 141d determines a threshold count has been met or exceeded).

FIG. 5 is a flowchart illustrating a method of configuring heap corruption detection. One or more of the steps illustrated in FIG. 5 may be performed by, for example, memory system 100, memory system 200, and/or their components. First circuitry is configured to write a first host process identification indicator to a first plurality of metadata field of accessed row information entries (502). For example, memory device 110 may receive, from controller 120, an indicator (e.g., mode register set-MRS-command) that configures metadata/counter operations circuitry 141 to write a current process identification indicator (e.g., a process identification number specified in, for example, configuration circuitry 141a or registers 141g) to the metadata field 150b of row information entries 150 being accessed in memory array 130 by the current process.

Second circuitry is configured to compare metadata values accessed from a second plurality of metadata fields from accessed row information entries to the first host process identification indicator (504). For example, memory device 110 may receive, from controller 120, another indicator (e.g., MRS command) that configures metadata/counter operations circuitry 141, and comparison circuitry 141d, in particular, to compare a current process identification indicator to the metadata field 150b value of row information entries 150 being accessed in memory array 130. Based on the respective results of the comparisons of the metadata values accessed from the second plurality of metadata fields, a memory component determines whether to initiate a first action (506). For example, based on whether the current process identification indicator matches (or does not match) the metadata field 150b value accessed from a row information entry, action circuitry 141f may determine whether to alert controller 120 to a mismatch.

FIG. 6 is a flowchart illustrating a method of operating a memory controller. One or more of the steps illustrated in FIG. 6 may be performed by, for example, memory system 100, memory system 200, and/or their components. To a memory component, where the memory component includes a dynamic random access memory (DRAM) array, and the DRAM array is to store a plurality of row information entries where each row information entry comprises a row data field and a metadata field, a first indicator is transmitted to configure first circuitry to perform a first function on values of metadata fields of accessed row information entries is received (602). For example, controller 120 may transmit, to memory device 110, an indicator (e.g., mode register set-MRS-command) that configures metadata/counter operations circuitry 141, and function circuitry 141c, in particular, to perform a first function (e.g., increment metadata field value when row is activated) on the values in metadata field 150b of row information entries 150 being accessed in memory array 130.

A second indicator is transmitted to the memory component to configure second circuitry to perform a first comparison function with values associated with metadata fields of accessed row information entries (604). For example, controller 120 may transmit, to memory device 110, another indicator (e.g., MRS command) that configures metadata/ counter operations circuitry 141, and comparison circuitry 141d, in particular, to perform a comparison function (e.g., has metadata field value met or exceeded a threshold) using the values in metadata field 150b of row information entries 150 being accessed in memory array 130. From the memory component, a third indicator is received that is based on a result of the first comparison function with a first value associated with a metadata field of a first accessed row information entry (606). For example, controller 120 may receive, from memory device 110, an indicator that comparison circuitry 141d has determined that a metadata field 150b has met (or not met) or exceeded (or not exceeded) a threshold value.

FIG. 7 is a flowchart illustrating a method of tracking metadata based events. One or more of the steps illustrated in FIG. 7 may be performed by, for example, memory system 100, memory system 200, and/or their components. A first indicator is transmitted to configure first circuitry of a memory device to perform a first function on values of metadata field of accessed row information entries (702). For example, controller 120, may transmit an indicator (e.g., mode register set-MRS-command) that configures metadata/ counter operations circuitry 141, and function circuitry 141c of memory device 110 to perform a first function (e.g., increment metadata field value when row is activated) on the values in metadata field 150b of row information entries 150 being accessed in memory array 130.

A second indicator is transmitted to configure second circuitry to perform a first comparison function with values associated with metadata fields of accessed row information entries is received (704). For example, controller 120 may transmit another indicator (e.g., MRS command) that configures metadata/counter operations circuitry 141, and comparison circuitry 141d of memory device 110 to perform a comparison function (e.g., has metadata field value met or exceeded a threshold) using the values in metadata field 150b of row information entries 150 being accessed in memory array 130. A third indicator is transmitted to configure third circuitry to, based on the results of the first comparison function, determine whether to initiate a first action by the memory component (706). For example, controller 120, may transmit yet another indicator (e.g., MRS command) that configures metadata/counter operations circuitry 141, and action circuitry 141f, of memory device 110, to, based on a result produced by comparison circuitry 141d, determine whether to initiate an action (e.g., notify controller 120 if comparison circuitry 141d determines a threshold count has been met or exceeded).

A fourth indicator is received from the memory device that was transmitted by the memory device based on a result of the first comparison function that is based on a first value associated with a first metadata field of a first accessed row information entry (708). For example, controller 120 may receive an indicator from memory device 110 that indicates a metadata value has met or exceeded a threshold.

Figure 8:
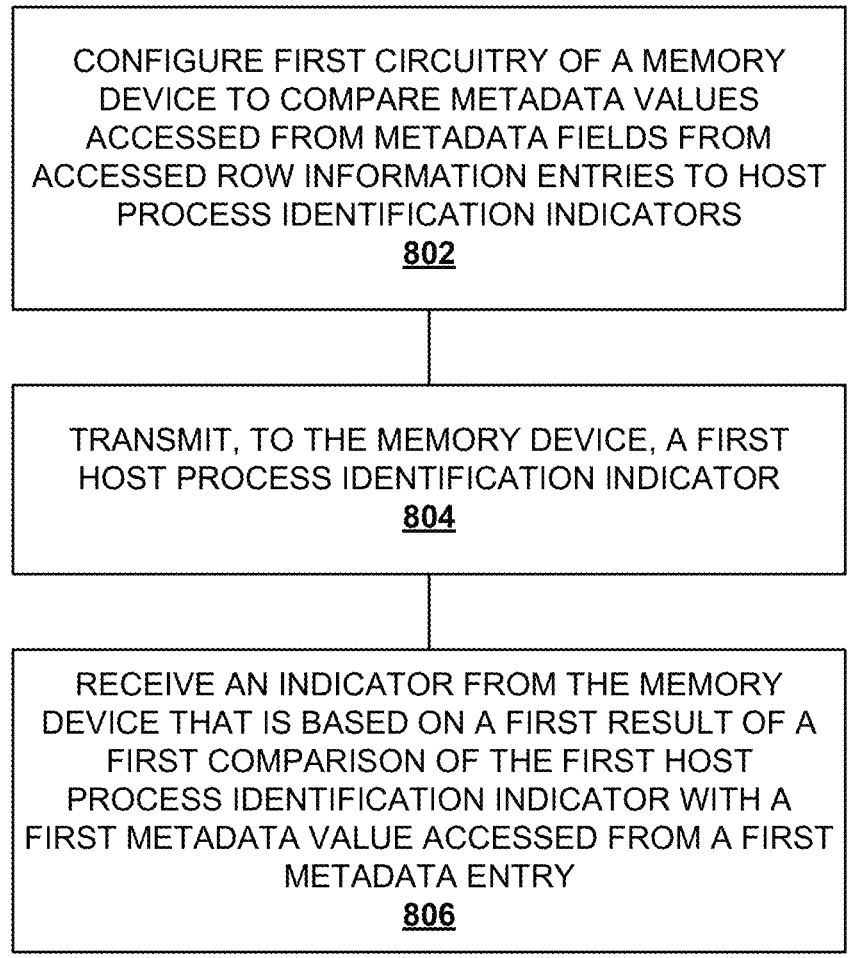
FIG. 8 is a flowchart illustrating a method of tracking heap corruption.
Figure 11:
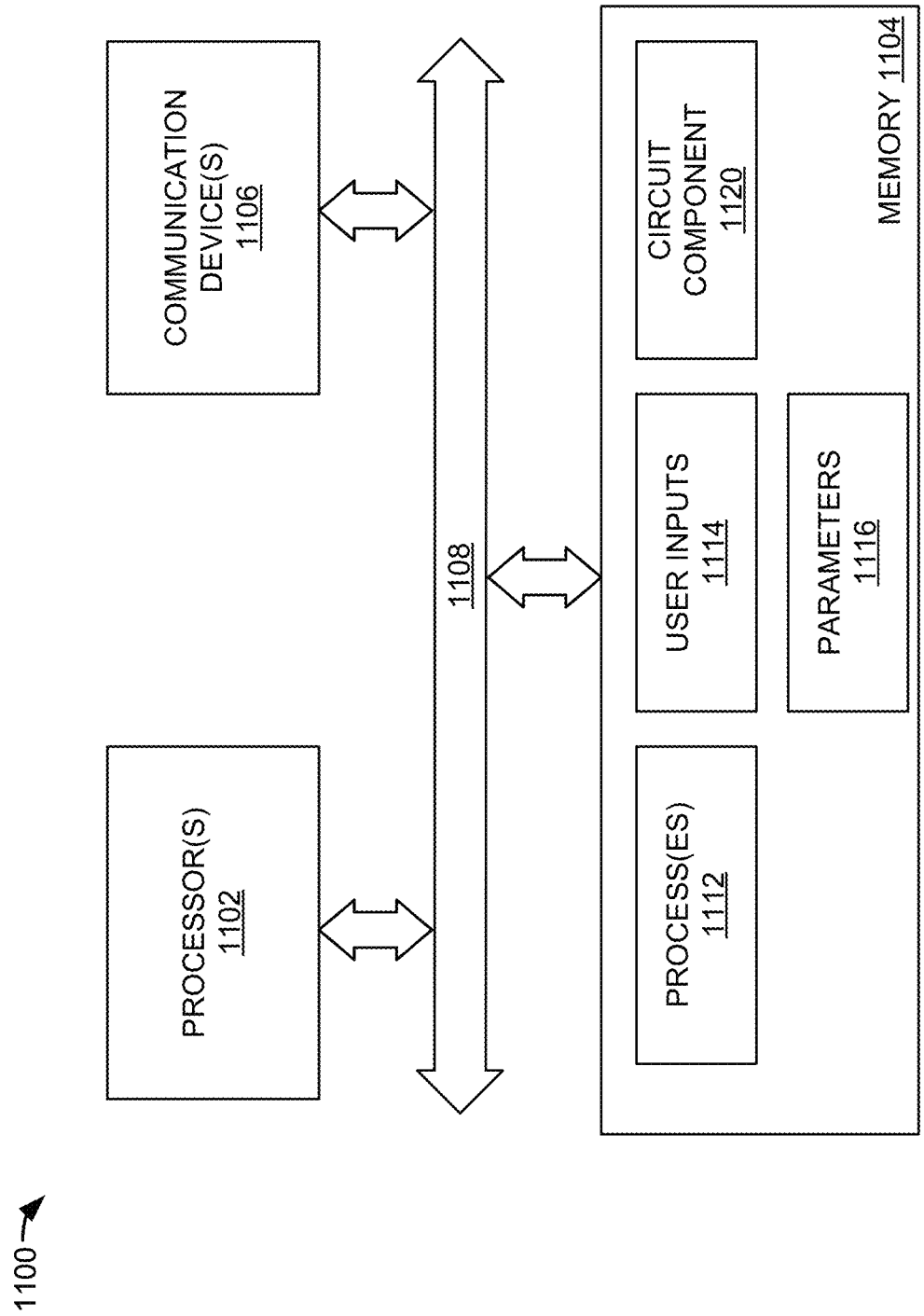
FIG. 11 is a block diagram of a processing system.

FIG. 8 is a flowchart illustrating a method of tracking heap corruption. One or more of the steps illustrated in FIG. 8 may be performed by, for example, memory system 100, memory system 200, and/or their components. First circuitry of a memory device is configured to compare metadata values of accessed row information entries to host process identification indicators (802). For example, controller 120 may configure memory device 110 to compare a current process identification indicator (e.g., a process identification number specified in, for example, configuration circuitry 141a or register circuitry 141g) to the metadata field 150b of row information entries 150 being accessed in memory array 130.

To the memory device, a first host process identification indicator is transmitted (804). For example, controller 120 may transmit, to memory device 110, a current process identification indicator that is to be compared to the metadata field 150b value of row information entries 150 being accessed in memory array 130. An indicator from the memory device that is based on a first result of a first comparison of the first host process identification indicator with a first metadata value access from a first metadata entry is received (806). For example, based on whether the current process identification indicator matches (or does not match) the metadata field 150b value accessed from a row information entry, controller 120 may receive an alert from memory device 110 that there was a mismatch between the current process identification indicator and a metadata value accessed from memory array 130.

FIG. 9 is a flowchart illustrating a method of concurrently tracking multiple types of metadata based events. One or more of the steps illustrated in FIG. 9 may be performed by, for example, memory system 100, memory system 200, and/or their components. By a memory component, and directed to a first memory device of the memory component, a first indicator is received to configure first circuitry of the first memory device to perform a first function on values of metadata field of accessed row information entries of the first memory device (902). For example, memory component 210 may receive, from controller 220 and directed to memory device 210a, an indicator (e.g., mode register set-MRS-command) that configures memory device 210a to perform a first function (e.g., increment metadata field value when row is activated) on the values in metadata field of row information entries being accessed in memory device 210a.

By the memory component, and directed to the first memory device of the memory component, a second indicator is received to configure second circuitry of the first memory device to perform a first comparison function with values associated with metadata fields of accessed row information entries of the first memory (906). For example, memory component 210 may receive, from controller 220 and directed to memory device 210a, another indicator (e.g., MRS command) that configures memory device 210a to perform a comparison function (e.g., has metadata field value met or exceeded a first threshold value) using the values in metadata field of row information entries being accessed in memory device 210a. By the memory component, and directed to the first memory device of the memory component, a third indicator is received to configure third circuitry of the first memory device to, based on the results of the first comparison function, determine whether to initiate a first action by the first memory device (908). For example, memory component 210 may receive, from controller 220 and directed to memory device 210a, yet another indicator (e.g., MRS command) that configures memory device 210a to, based on a result produced by comparison circuitry of first memory device 210a, determine whether to initiate an action (e.g., notify controller 220 if memory device 210a determines the first threshold count has been met or exceeded).

By the memory component, and directed to a second memory device of the memory component, a fourth indicator is received to configure first circuitry of the second memory device to perform a second function on values of metadata field of accessed row information entries of the second memory device (910). For example, memory component 210 may receive, from controller 220 and directed to memory device 210b, an indicator (e.g., mode register set-MRS-command) that configures memory device 210b to perform a second function (e.g., increment metadata field value when row is written to) on the values in metadata field of row information entries being accessed in memory device 210b.

By the memory component, and directed to the second memory device of the memory component, a fifth indicator is received to configure second circuitry of the second memory device to perform a second comparison function with values associated with metadata fields of accessed row information entries of the second memory (912). For example, memory component 210 may receive, from controller 220 and directed to memory device 210b, another indicator (e.g., MRS command) that configures memory device 210b to perform a comparison function (e.g., has metadata field value met or exceeded a second threshold) using the values in metadata field of row information entries being accessed in memory device 210b. By the memory component, and directed to the second memory device of the memory component, a sixth indicator is received to configure third circuitry of the second memory device to, based on the results of the second comparison function, determine whether to initiate a second action by the second memory device (914). For example, memory component 210 may receive, from controller 220 and directed to memory device 210b, yet another indicator (e.g., MRS command) that configures memory device 210b to, based on a result produced by comparison circuitry of memory device 210b, determine whether to initiate an action (e.g., notify controller 220 if memory device 210b determines the second threshold count has been met or exceeded).

FIG. 10 is a flowchart illustrating a method of configuring a memory component to track multiple types of metadata based events. One or more of the steps illustrated in FIG. 10 may be performed by, for example, memory system 100, memory system 200, and/or their components. To a memory component, and directed to a first memory device of the memory component, a first indicator is transmitted to configure first circuitry of the first memory device to perform a first function on values of metadata field of accessed row information entries of the first memory device is received (1002). For example, controller 220 may transmit, to memory component 210 and directed to memory device 210a, an indicator (e.g., mode register set—MRS—command) that configures memory device 210a to perform a first function (e.g., increment metadata field value when row is activated) on the values in metadata field of row information entries being accessed in memory device 210a.

To the memory component, and directed to the first memory device of the memory component, a second indicator is transmitted to configure second circuitry of the first memory device to perform a first comparison function with values associated with metadata fields of accessed row information entries of the first memory is received (1006). For example, controller 220 may transmit, to memory component 210 and directed to memory device 210a, another indicator (e.g., MRS command) that configures memory device 210a to perform a comparison function (e.g., has metadata field value met or exceeded a first threshold value) using the values in metadata field of row information entries being accessed in memory device 210a. To the memory component, and directed to the first memory device of the memory component, a third indicator is transmitted to configure third circuitry of the first memory device to, based on the results of the first comparison function, determine whether to initiate a first action by the first memory device (1008). For example, controller 220 may transmit yet another indicator (e.g., MRS command) to memory component 210 and directed to memory device 210a that configures memory device 210a to, based on a result produced by comparison circuitry of first memory device 210a, determine whether to initiate an action (e.g., notify controller 220 if memory device 210a determines the first threshold count has been met or exceeded).

To the memory component, and directed to a second memory device of the memory component, a fourth indicator is transmitted to configure first circuitry of the second memory device to perform a second function on values of metadata field of accessed row information entries of the second memory device (1010). For example, controller 220 may transmit to memory component 210 and directed to memory device 210b an indicator (e.g., mode register set-MRS-command) that configures memory device 210b to perform a second function (e.g., increment metadata field value when row is written to) on the values in metadata field of row information entries being accessed in memory device 210b.

To the memory component, and directed to the second memory device of the memory component, a fifth indicator is transmitted to configure second circuitry of the second memory device to perform a second comparison function with values associated with metadata fields of accessed row information entries of the second memory (1012). For example, controller 120 may transmit to memory component 210 and directed to memory device 210*b*, another indicator (e.g., MRS command) that configures memory device 210*b* to perform a comparison function (e.g., has metadata field value met or exceeded a second threshold) using the values in metadata field of row information entries being accessed in memory device 210*b*. By the memory component, and directed to the second memory device of the memory component, a sixth indicator is transmitted to configure third circuitry of the second memory device to, based on the results of the second comparison function, determine whether to initiate a second action by the second memory device (1014). For example, controller 120 may transmit to memory component 210 and directed to memory device 210*b*, yet another indicator (e.g., MRS command) that configures memory device 210*b* to, based on a result produced by comparison circuitry of memory device 210*b*, determine whether to initiate an action (e.g., notify controller 220 if memory device 210*b* determines the second threshold count has been met or exceeded).

Implementations discussed herein include, but are not limited to, the following examples:

Example 1: A memory component, comprising: a command/address interface; a first dynamic random access memory (DRAM) array having memory element rows and memory element columns; a first plurality of memory element columns to store row data associated with a first plurality of memory element rows; a second plurality of memory element columns to store a first plurality of row metadata values respectively associated with each of the first plurality of memory element rows; and metadata value processing circuitry to, based on accesses to respective ones of the first plurality of memory element rows, determine row metadata values to be stored in the second plurality of memory element columns in response to the accesses, the metadata value processing circuitry configurable, using the command/address interface, to determine events that change row metadata values, a threshold row metadata value that triggers an action in response to a row metadata value meeting the threshold row metadata value, and an action to be taken in response to the row metadata value meeting the threshold row metadata value.

Example 2: The memory component of claim 1, wherein events that change row metadata values are configurable to include one or more of row activation, row access, and row refresh.

Example 3: The memory component of claim 2, wherein changes to row metadata values are configurable to include increment row metadata value and decrement row metadata value.

Example 4: The memory component of claim 1, wherein the row metadata value meeting the threshold row metadata value is associated with a row accessed using a row address, and the action triggered in response to the row metadata value meeting the threshold row metadata value is configurable to include at least one of transmitting an indicator that the row metadata value has met the threshold row metadata value, storing an indicator that the row metadata value has met the threshold row metadata value, and storing an indicator of the row address.

Example 5: The memory component of claim 1, further comprising: circuitry configurable to find an extremum of row count values and associated row address.

Example 6: The memory component of claim 5, wherein events that change row metadata values is configurable to include errors detected in response to accessing rows.

Example 7: The memory component of claim 5, wherein the action triggered in response to the row metadata value meeting the threshold row metadata value is configurable to include resetting the row metadata value to an initial value.

Example 8: A memory component, comprising: a dynamic random access memory (DRAM) array to store a plurality of row information entries, each row information entry comprising a row data field and a counter field; a command/address interface to receive a first access command to access a first row information entry comprising first row data and a first row metadata value; and metadata value processing circuitry to, based on the first access command, perform a configurable function on the first row metadata value to produce a first result row metadata value, perform a configurable comparison function on at least one of the first row metadata value and the first result row metadata value, and based on a first result of the configurable comparison function, perform a configurable action.

Example 9: The memory component of claim 8, wherein the configurable function, the configurable comparison function, and the configurable action are settable using at least the command/address interface.

Example 10: The memory component of claim 8, wherein the first result row metadata value is, in response to the first access command, written to the first row information entry.

Example 11: The memory component of claim 8, wherein the configurable function is settable to at least incrementing the first row metadata value and settable to at least decrementing the first row metadata value.

Example 12: The memory component of claim 8, wherein the configurable comparison function is settable to comparing the first result row metadata value to a configurable threshold value.

Example 13: The memory component of claim 8, wherein the configurable comparison function is settable to find an extrema among values stored in the counter field of the plurality of row information entries.

Example 14: The memory component of claim 8, further comprising error detecting circuitry to determine a number of errors in the row information entries when respective row information entries are accessed and the configurable function is settable to accumulating the number of errors.

Example 15: A method of operating a memory component, comprising: receiving, by the memory component, where the memory component includes a dynamic random access memory (DRAM) array, and the DRAM array is to store a plurality of row information entries where each row information entry comprises a row data field and a metadata field, a first indicator to configure first circuitry to perform a first function on values of metadata fields of accessed row information entries; configuring the first circuitry to perform the first function on the values of the metadata fields of accessed row information entries; receiving, by the memory component, a second indicator to configure second circuitry to perform a first comparison function with values associated with metadata fields of accessed row information entries; and configuring the second circuitry to perform the first comparison function with the values of the metadata fields of accessed row information entries.

Example 16: The method of claim 15, wherein the metadata fields comprise metadata value information associated with accesses to corresponding row information entries.

Example 17: The method of claim 15, further comprising: receiving, by the memory component, a third indicator to configure third circuitry to, based on results of the first comparison function performed on respective values associated with metadata fields of accessed row information entries, determine whether to initiate a first action by the memory component; and configuring the third circuitry to, based on the results of the first comparison function performed on a first value associated with a first metadata field of a first accessed row information entry, initiate the first action by the memory component.

Example 18: The method of claim 17, wherein the first comparison function determines whether the values of the metadata fields of accessed row information entries meet a threshold condition.

Example 19: The method of claim 18, further comprising: receiving, by the memory component, a fourth indicator to configure the third circuitry with the threshold condition; and configuring the third circuitry with the threshold condition.

Example 20: The method of claim 19, wherein the threshold condition comprises a host process identification indicator.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory component, comprising:
    a command/address interface;
    a first random access memory array having memory element rows and memory element columns;
    a first plurality of memory element columns to store row data associated with a first plurality of memory element rows;
    a second plurality of memory element columns to store a first plurality of row metadata values respectively associated with each of the first plurality of memory element rows; and
    metadata value processing circuitry to, based on accesses to respective ones of the first plurality of memory element rows, determine row metadata values to be stored in the second plurality of memory element columns in response to the accesses, the metadata value processing circuitry configurable, using the command/address interface, to determine events that change row metadata values, a threshold row metadata value that triggers an action in response to a row metadata value meeting the threshold row metadata value, and an action to be taken in response to the row metadata value meeting the threshold row metadata value.

2. The memory component of claim 1, wherein events that change row metadata values are configurable to include one or more of row activation, row access, and row refresh.

3. The memory component of claim 2, wherein changes to row metadata values are configurable to include increment row metadata value and decrement row metadata value.

4. The memory component of claim 1, wherein the row metadata value meeting the threshold row metadata value is associated with a row accessed using a row address, and the action triggered in response to the row metadata value meeting the threshold row metadata value is configurable to include at least one of transmitting an indicator that the row metadata value has met the threshold row metadata value, storing an indicator that the row metadata value has met the threshold row metadata value, and storing an indicator of the row address.

5. The memory component of claim 1, further comprising:
    circuitry configurable to find an extremum of row count values and associated row address.

6. The memory component of claim 5, wherein events that change row metadata values is configurable to include errors detected in response to accessing rows.

7. The memory component of claim 5, wherein the action triggered in response to the row metadata value meeting the threshold row metadata value is configurable to include resetting the row metadata value to an initial value.

8. A memory component, comprising:
    a random access memory array to store a plurality of row information entries, each row information entry comprising a row data field and a counter field;
    a command/address interface to receive a first access command to access a first row information entry comprising first row data and a first row metadata value; and
    metadata value processing circuitry to, based on the first access command, perform a configurable function on the first row metadata value to produce a first result row metadata value, perform a configurable comparison function on at least one of the first row metadata value and the first result row metadata value, and based on a first result of the configurable comparison function, perform a configurable action.

9. The memory component of claim 8, wherein the configurable function, the configurable comparison function, and the configurable action are settable using at least the command/address interface.

10. The memory component of claim 8, wherein the first result row metadata value is, in response to the first access command, written to the first row information entry.

11. The memory component of claim 8, wherein the configurable function is settable to at least incrementing the first row metadata value and settable to at least decrementing the first row metadata value.

12. The memory component of claim 8, wherein the configurable comparison function is settable to comparing the first result row metadata value to a configurable threshold value.

13. The memory component of claim 8, wherein the configurable comparison function is settable to find an extrema among values stored in the counter field of the plurality of row information entries.

14. The memory component of claim 8, further comprising error detecting circuitry to determine a number of errors in the row information entries when respective row information entries are accessed and the configurable function is settable to accumulating the number of errors.

15. A method of operating a memory component, comprising:
receiving, by the memory component, where the memory component includes a random access memory array, and the memory array is to store a plurality of row information entries where each row information entry comprises a row data field and a metadata field, a first indicator to configure first circuitry to perform a first function on values of metadata fields of accessed row information entries;
configuring the first circuitry to perform the first function on the values of the metadata fields of accessed row information entries;
receiving, by the memory component, a second indicator to configure second circuitry to perform a first comparison function with values associated with metadata fields of accessed row information entries; and
configuring the second circuitry to perform the first comparison function with the values of the metadata fields of accessed row information entries.

16. The method of claim 15, wherein the metadata fields comprise metadata value information associated with accesses to corresponding row information entries.

17. The method of claim 15, further comprising:
receiving, by the memory component, a third indicator to configure third circuitry to, based on results of the first comparison function performed on respective values associated with metadata fields of accessed row information entries, determine whether to initiate a first action by the memory component; and
configuring the third circuitry to, based on the results of the first comparison function performed on a first value associated with a first metadata field of a first accessed row information entry, initiate the first action by the memory component.

18. The method of claim 17, wherein the first comparison function determines whether the values of the metadata fields of accessed row information entries meet a threshold condition.

19. The method of claim 18, further comprising:
receiving, by the memory component, a fourth indicator to configure the third circuitry with the threshold condition; and
configuring the third circuitry with the threshold condition.

20. The method of claim 19, wherein the threshold condition comprises a host process identification indicator.

* * * * *